US010270645B2

United States Patent
Ramasubramanian et al.

(10) Patent No.: US 10,270,645 B2
(45) Date of Patent: Apr. 23, 2019

(54) SYSTEMS AND METHODS FOR HANDLING LINK AGGREGATION FAILOVER WITH A CONTROLLER

(71) Applicant: Big Switch Networks, Inc., Santa Clara, CA (US)

(72) Inventors: Srinivasan Ramasubramanian, Sunnyvale, CA (US); Vishnu Emmadi, Sunnyvale, CA (US); Sudeep Dilip Modi, Milpitas, CA (US); Kanzhe Jiang, Los Altos Hills, CA (US); Kuang-Ching Wang, Central, SC (US); Gregor Mathias Maier, Alameda, CA (US); Mei Yang, Fremont, CA (US); Robert W. Sherwood, Oakland, CA (US); Mandeep Singh Dhami, San Jose, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 491 days.

(21) Appl. No.: 14/337,161

(22) Filed: Jul. 21, 2014

(65) Prior Publication Data

US 2016/0020939 A1 Jan. 21, 2016

(51) Int. Cl.
*H04L 12/24* (2006.01)
*H04L 12/713* (2013.01)

(52) U.S. Cl.
CPC ...... *H04L 41/0654* (2013.01); *H04L 41/0659* (2013.01); *H04L 45/586* (2013.01)

(58) Field of Classification Search
CPC .......................... H04L 41/0816; H04L 41/085
(Continued)

(56) References Cited

U.S. PATENT DOCUMENTS 7,529,180 B1 5/2009 Karl et al.
7,577,098 B2 8/2009 Tamura et al.
(Continued)

FOREIGN PATENT DOCUMENTS

EP 1289191 3/2003
EP 2621136 7/2013
(Continued)

OTHER PUBLICATIONS

Pfaff et al., OpenFlow Switch Specification, Dec. 31, 2009, 42 pages.
(Continued)

*Primary Examiner* — Melvin C Marcelo
*Assistant Examiner* — Natali Pascual Peguero
(74) *Attorney, Agent, or Firm* — Treyz Law Group, P.C.; Tianyi He; Michael H. Lyons

(57) ABSTRACT

A network of switches having ports coupled to other switches or end hosts may be controlled by a controller. The controller may identify whether any switch ports have failed. In response to identifying that a port has failed at a first switch, the controller may modify link aggregation group mappings of the other switches to handle failover. The controller may modify the link aggregation group mapping of each other switch to include a first mapping that includes ports coupled to the first switch and a second mapping that does not include any ports coupled to the first switch. The controller may configure forwarding tables at the switches to forward network packets using the first or second mappings based on network topology information maintained by the controller.

20 Claims, 19 Drawing Sheets

(58) Field of Classification Search
USPC .................. 370/217, 218, 224, 256, 358
See application file for complete search history.

(56) References Cited

U.S. PATENT DOCUMENTS

| | | | |
|---|---|---|---|
| 7,710,867 | B1 | 5/2010 | Masters |
| 8,098,572 | B2 | 1/2012 | Zhou et al. |
| 8,300,523 | B2 | 10/2012 | Salam et al. |
| 8,321,555 | B2 | 11/2012 | Gunther |
| 8,321,938 | B2 | 11/2012 | Strayer et al. |
| 8,565,108 | B1 | 10/2013 | Marshall |
| 8,566,649 | B1* | 10/2013 | Bishara .............. H04L 49/552 370/224 |
| 8,665,699 | B2 | 3/2014 | Bellagamba et al. |
| 8,819,235 | B2 | 8/2014 | Cardona et al. |
| 2003/0105881 | A1* | 6/2003 | Symons .............. H04L 29/06 709/249 |
| 2003/0208618 | A1* | 11/2003 | Mor .............. H04L 45/00 709/238 |
| 2004/0013120 | A1 | 1/2004 | Shen |
| 2004/0139236 | A1 | 7/2004 | Mehra et al. |
| 2006/0031374 | A1 | 2/2006 | Lu et al. |
| 2006/0098589 | A1* | 5/2006 | Kreeger .............. H04L 45/48 370/256 |
| 2006/0218404 | A1 | 9/2006 | Ogura |
| 2008/0189769 | A1 | 8/2008 | Casado et al. |
| 2008/0240133 | A1* | 10/2008 | Tanaka .............. H04L 45/245 370/401 |
| 2009/0080338 | A1 | 3/2009 | Parker |
| 2010/0020680 | A1* | 1/2010 | Salam .............. H04L 43/0811 370/225 |
| 2010/0080226 | A1 | 4/2010 | Khalid et al. |
| 2010/0242093 | A1 | 9/2010 | Zuk et al. |
| 2010/0315943 | A1* | 12/2010 | Chao .............. H04L 41/0668 370/221 |
| 2011/0087979 | A1 | 4/2011 | Breslin et al. |
| 2011/0268125 | A1 | 11/2011 | Vobbilisetty et al. |
| 2012/0230182 | A1* | 9/2012 | Southworth .......... H04L 49/3009 370/217 |
| 2012/0250679 | A1* | 10/2012 | Judge .............. H04L 49/351 370/359 |
| 2012/0266013 | A1* | 10/2012 | Shannon .............. H04L 41/08 714/4.2 |
| 2012/0275297 | A1* | 11/2012 | Subramanian ........ H04L 45/245 370/225 |
| 2013/0010600 | A1 | 1/2013 | Jocha et al. |
| 2013/0022767 | A1 | 1/2013 | Ahmad et al. |
| 2013/0028072 | A1* | 1/2013 | Addanki .............. H04L 49/557 370/218 |
| 2013/0058354 | A1 | 3/2013 | Casado et al. |
| 2013/0073743 | A1 | 3/2013 | Ramasamy et al. |
| 2013/0227670 | A1 | 4/2013 | Ahmad et al. |
| 2013/0229912 | A1* | 9/2013 | Yu .............. H04L 41/0663 370/228 |
| 2013/0242998 | A1* | 9/2013 | Deshpande .......... H04L 45/02 370/392 |
| 2014/0036924 | A1* | 2/2014 | Christenson ........ H04L 12/4641 370/395.53 |
| 2014/0198649 | A1* | 7/2014 | Jain .............. H04L 47/41 370/235 |

FOREIGN PATENT DOCUMENTS

| | | | |
|---|---|---|---|
| EP | 2621136 A2 * | 7/2013 | .......... H04L 45/245 |
| EP | 2629464 | 8/2013 | |
| WO | 01/63838 | 8/2001 | |
| WO | 2013118873 | 8/2013 | |
| WO | WO 2015077878 A1 * | 6/2015 | .......... H04L 12/462 |

OTHER PUBLICATIONS

Mehta et al., U.S. Appl. No. 13/754,671, filed Jan. 30, 2013.
Mehta et al., U.S. Appl. No. 13/776,419, filed Feb. 25, 2013.
Mehta et al., U.S. Appl. No. 14/661,336, filed Mar. 18, 2015.
Emmadi et al., U.S. Appl. No. 14/618,635, filed Feb. 10, 2015.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * | | SEND TO PORT 3 |
| * | * | * | * | 172.12.3.4 | * | * | ⋮ | SEND TO PORT 4 |
| * | * | * | * | * | * | 80 | | DROP |

FIG. 4

VIRTUAL SWITCH IDENTIFICATION TABLE
FOR SWITCH E4

L2 FORWARDING TABLE

SYSTEMS AND METHODS FOR HANDLING LINK AGGREGATION FAILOVER WITH A CONTROLLER

BACKGROUND

This relates to communication networks, and more particularly, to communications networks having network switches that are controlled by a controller.

Packet-based networks such as the Internet and local data networks that are connected to the internet include network switches. Network switches are used in forwarding packets from packet sources to packet destinations. The packets may be sometimes referred to as frames. For example, data is forwarded over layer 2 of the Open Systems Interconnection (OSI) model as frames (e.g., Ethernet frames), whereas data is forwarded over layer 3 of the OSI model as packets (e.g., Internet Protocol packets).

It can be difficult or impossible to configure the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

Switches include ports that may be coupled to other network devices such as end hosts or other switches. Some switches are capable of implementing link aggregation groups (LAGs) from groups of ports. In link aggregation arrangements, multiple links to other network devices are combined to form a single logical connection over which network packets may be forwarded. Each switch can monitor its own ports to identify port failure and update its own link aggregation groups to remove failed ports. However, it can be challenging for switches to handle port failures at other switches. For example, it can be challenging for a first switch to respond to port failures at a second switch. Conventionally, the first switch responds merely by removing any of its ports that are connected to the second switch from the link aggregation groups of the first switch. However, this can lead to inefficient utilization of network resources, because at least some of the ports of the second switch are still functioning and can be used for network forwarding.

SUMMARY

A network of switches may be controlled by a controller such as a controller server or a distributed controller. Each switch may include ports that are coupled to other switches or end hosts. The controller may identify whether any switch ports have failed. For example, the controller may direct the switches to provide updates whenever a port has failed. In this scenario, the controller may receive a port failure message from the switches that identifies failed ports. In response to identifying that a port has failed at a first switch, the controller may modify link aggregation group mappings of the other switches to handle failover. The controller may provide or modify a link aggregation table at a second switch to have a first link aggregation table entry in which ports that are coupled to the first switch are removed. The controller may configure the link aggregation table of the second switch to include a second link aggregation table entry that includes the ports that are coupled to the first switch.

The controller may configure a forwarding table at the second switch with forwarding table entries that direct the second switch to forward network packets for a first destination end host using the first link aggregation table entry and to forward network packets for a second destination end host using the second link aggregation table entry. The first destination end host may be coupled to the first switch through the failed port and therefore the second switch should not forward network packets for the first destination end host through the first switch (e.g., the first link aggregation table entry should be used). The second destination end host may be coupled to the first switch through a functioning port of the first switch and therefore the second link aggregation table entry should be used.

Further features of the present invention, its nature and various advantages will be more apparent from the accompanying drawings and the following detailed description.

BRIEF DESCRIPTION OF THE DRAWINGS

FIG. 4 is a diagram of an illustrative flow table of the type that may be used by a packet processing system showing three illustrative types of packet forwarding that may be performed based on the flow table entries of the flow table in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller such as a controller server or distributed controller server may interact with each of the control clients over respective network links. The use of a cross-platform controller and corresponding controller clients allows potentially disparate network switch equipment to be centrally managed.

Figure 1:
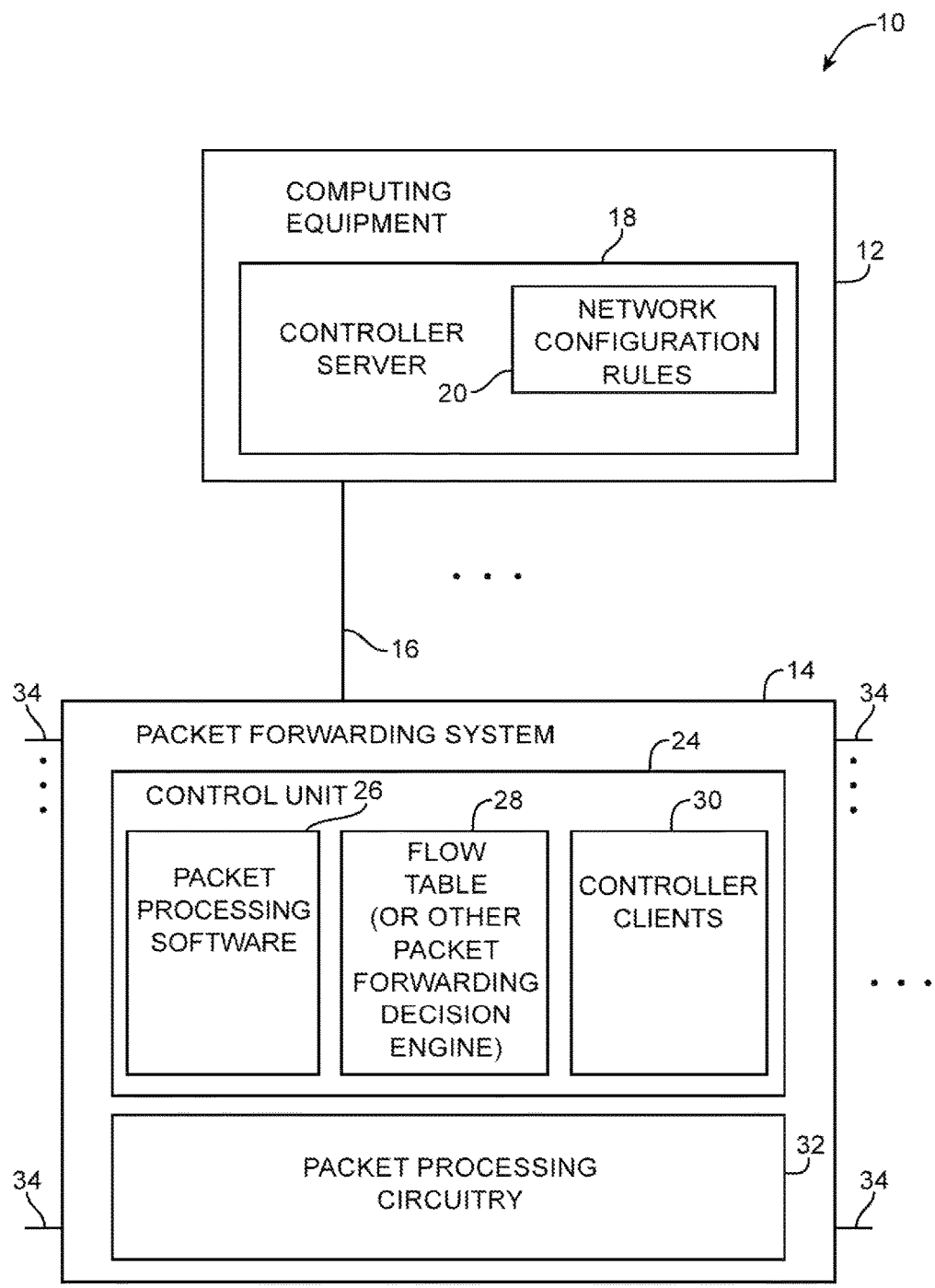
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. As another example, rules 20 may include service insertion policies identifying network traffic and services that are to be performed on the identified network traffic. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0, 1.3.1, or other versions of the OpenFlow protocol). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Any desired switch may be provided with controller clients that communicate with and are controlled by a controller server. For example, switch 14 may be implemented using a general purpose processing platform that runs control software and that omits packet processing circuitry 32. As another example, switch 14 may be implemented using control circuitry that is coupled to one or more high-speed switching integrated circuits ("switch ICs"). As yet another example, switch 14 may be implemented as a line card in a rack-based system having multiple line cards each with its own packet processing circuitry. The controller server may, if desired, be implemented on one or more line cards in the rack-based system, in another rack-based system, or on other computing equipment that is coupled to the network.

Figure 2:
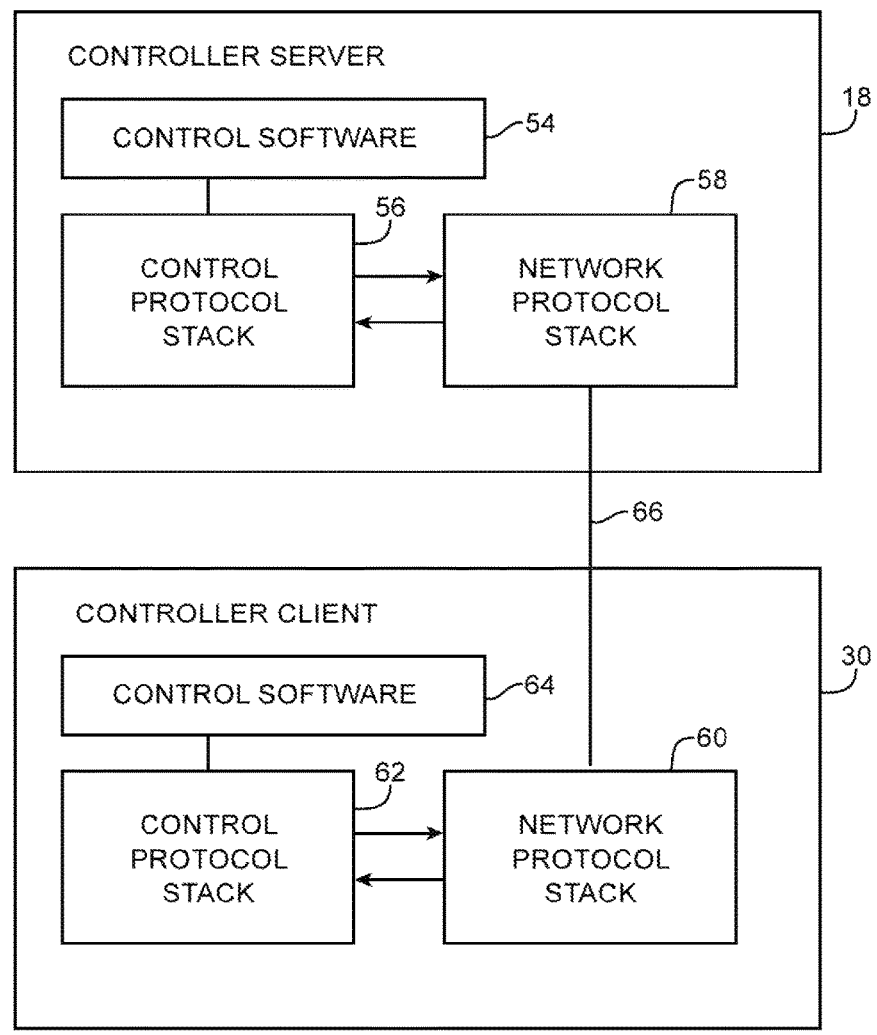
FIG. 2 is a diagram of a controller server and controller client that may communicate over a network connection in accordance with an embodiment of the present invention.

As shown in FIG. 2, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a backbone path in a rack-based system. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 2, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 3:
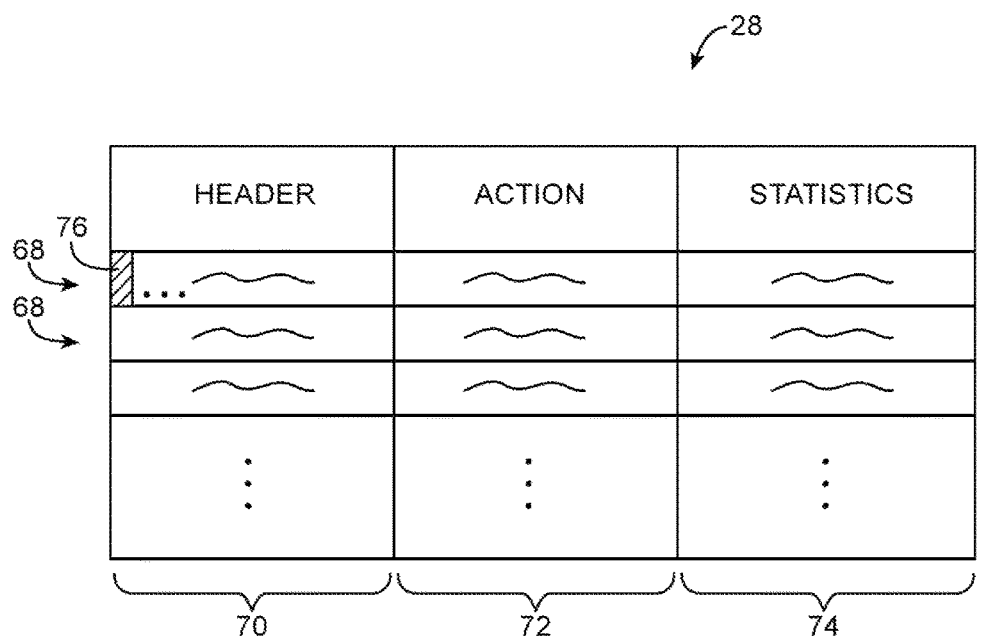
FIG. 3 is a diagram of an illustrative flow table of the type that may be used by a packet processing system in accordance with an embodiment of the present invention.

An illustrative flow table is shown in FIG. 3. As shown in FIG. 3, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port. The modify-field actions may be used in rewriting portions of network packets that match the flow table entry.

FIG. 4 is an illustrative flow table having three flow table entries. The entries include fields with wildcards (e.g., "★" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 4 table directs the switch in which the flow table entry is operating to perform Ethernet switching. In particular, incoming packets with matching Ethernet destination addresses are forwarded to port 3.

The entry of the second row of table of FIG. 4 illustrates how a switch may be configured to perform internet routing (i.e., packets are forwarded based on their destination IP address).

The third row of the table of FIG. 4 contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 4 may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network.

Figure 5:
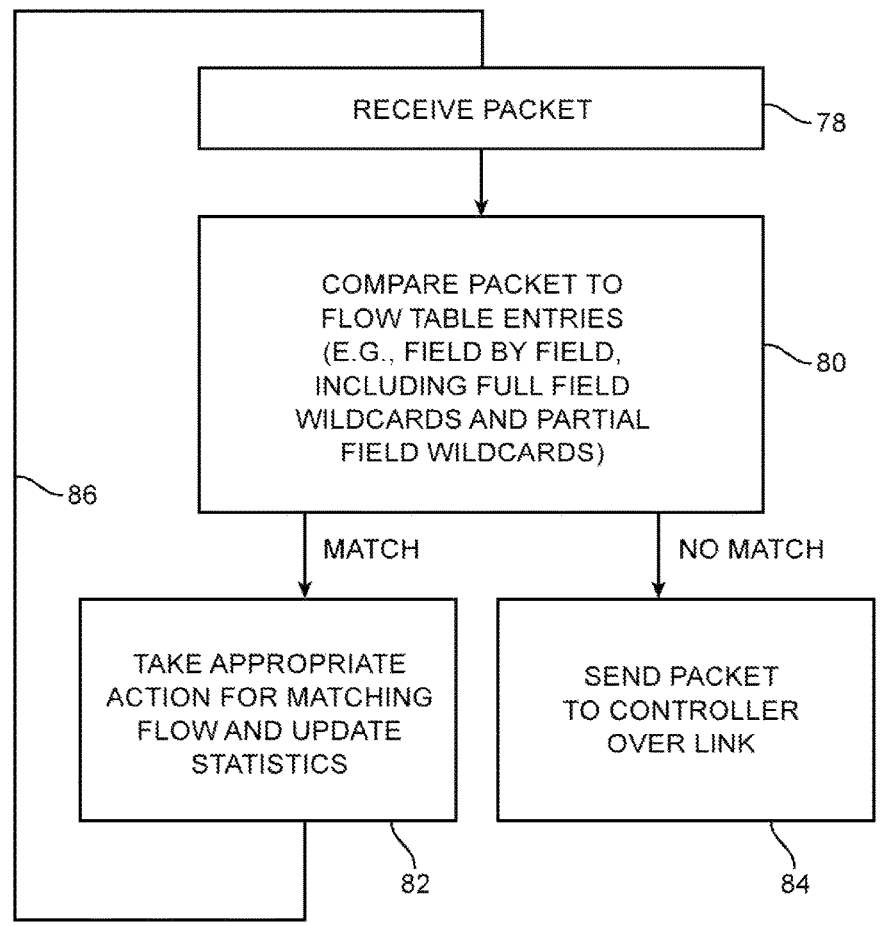
FIG. 5 is a flow chart of illustrative steps involved in processing packets in a packet processing system in accordance with an embodiment of the present invention.

Illustrative steps that may be performed by switch 14 in processing packets that are received on input-output ports 34 are shown in FIG. 5. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "★"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 6:
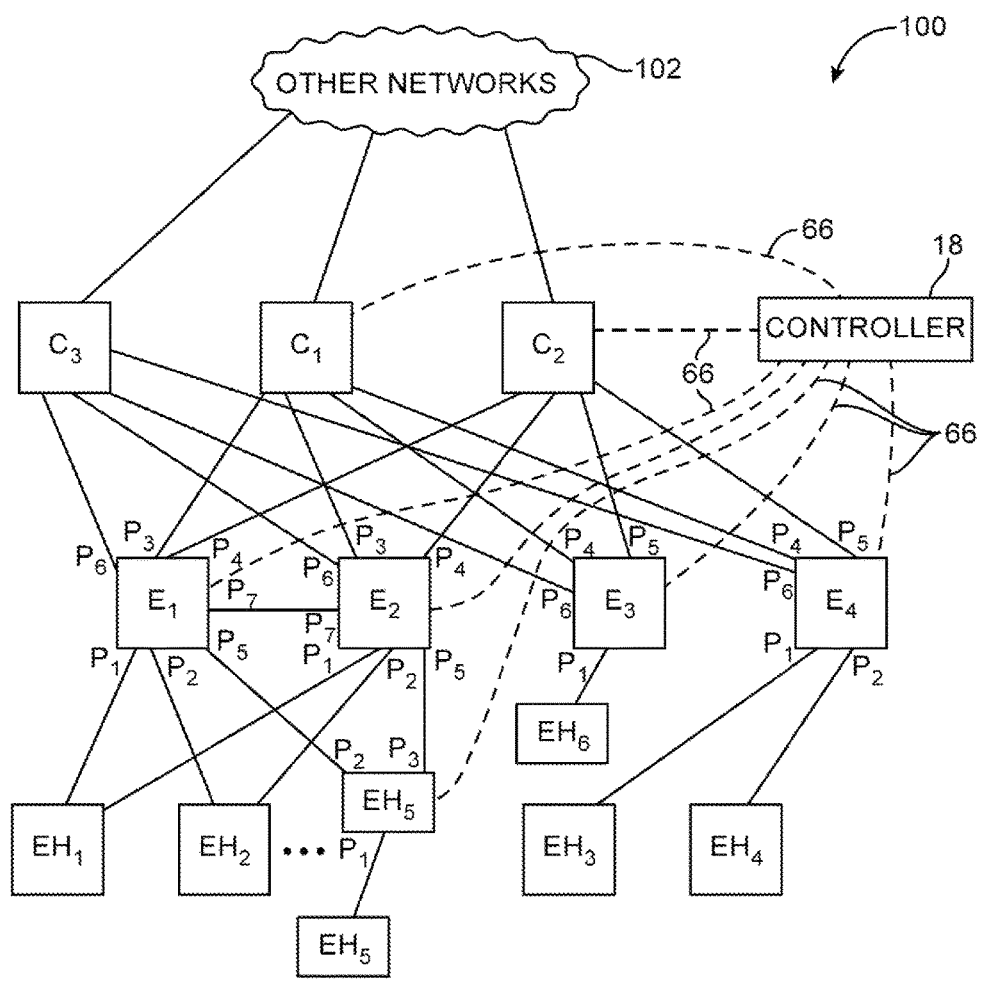
FIG. 6 is a diagram of an illustrative network having switches that may be controlled by a controller to handle link aggregation failover in accordance with an embodiment of the present invention.

FIG. 6 is a diagram of an illustrative network 100 in which switches may be controlled by a controller 18. Controller 18 may be a controller server or a distributed controller implemented across multiple computing equipment. As shown in FIG. 6, network 100 may include switches C1, C2, C3, E1, E2, E3, E4, and E5. Controller 18 may be coupled to the switches of network 100 via control paths 66. Controller 18 may control the switches using control paths 66 (e.g., by providing flow table entries such as flow table entries 68 of FIG. 3).

Switches include ports to which other network devices such as switches and end hosts are connected. For example, switch E1 includes ports P1-P6, switch E2 includes ports P1-P6, switch E3 includes ports P1, P4, P5, and P6, and switch E4 includes ports P1, P2, P4, P5, and P6. Network 100 may include end hosts such as end hosts EH1, EH2, EH3, EH4, EH5, and EH6 that are coupled to ports of the switches of network 100. Switches that are directly coupled to end hosts may sometimes be referred to as edge switches, whereas switches that merely interconnect other switches and are not directly coupled to the end hosts may be referred to as core switches. In the example of FIG. 6, switches E1, E2, E3, E4, and E5 are edge switches, because they are coupled to end hosts. Switches C1, C2, and C3 are core switches, because switches C1, C2, and C3 interconnect switches E1, E2, E3, E4, and E5 and are not directly coupled to end hosts. Core switches such as switches C1 and C2 may couple network 100 to other networks 102 (e.g., other networks including switches and end hosts). The example of FIG. 6 in which edge switches are directly coupled to core switches are merely illustrative. If desired, additional switches may be interposed between the edge and core switches.

Figure 7:
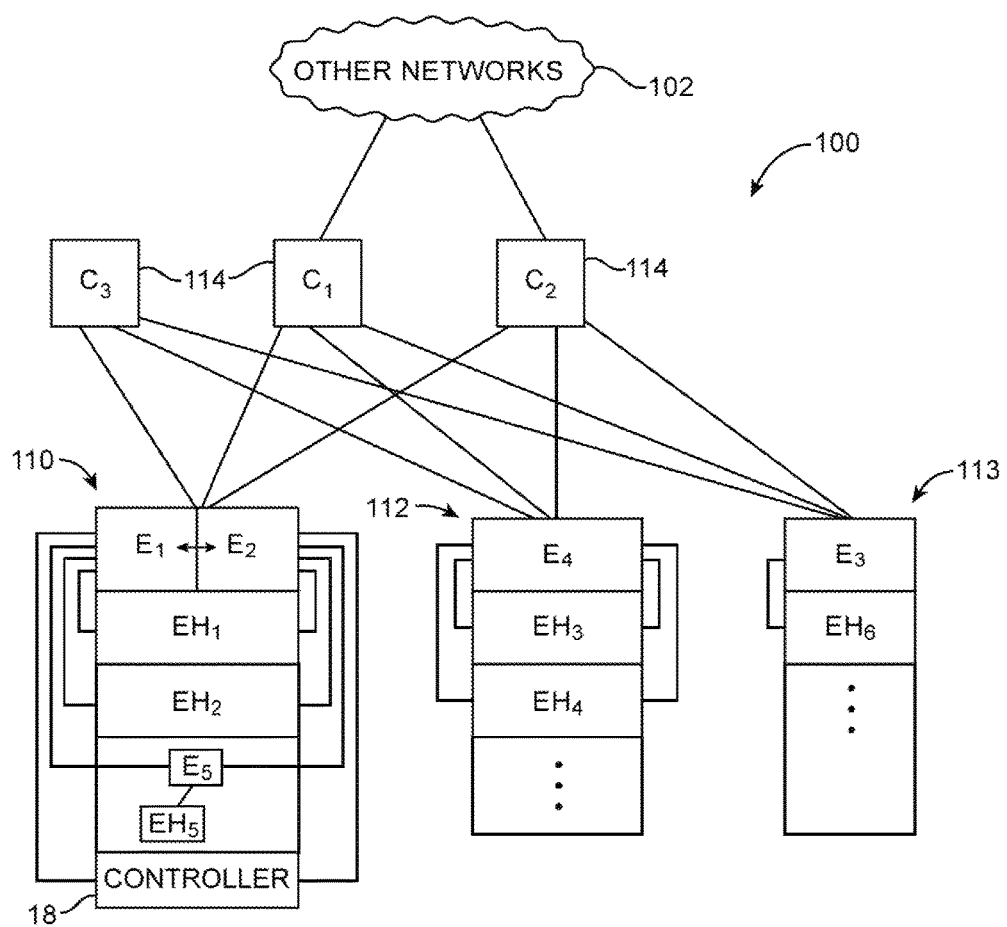
FIG. 7 is a diagram of an illustrative rack-based system that implements a network having switches that may be controlled by a controller to handle link aggregation failover in accordance with an embodiment of the present invention.

FIG. 7 is an illustrative example of network 100 of FIG. 6 that is implemented using rack-based systems. As shown in FIG. 7, edge switches and end hosts may be implemented using network racks 110, 112, and 113 that are coupled to switches 114 (e.g., core switches C1, C2, and C3 as shown in FIG. 7). If desired, network 100 may include additional network racks that house additional end hosts and switches and are coupled to switches 114. Network rack 110 may include edge switches E1 and E2 and end hosts EH1, EH2, and EH5, whereas network rack 112 may include edge switch E4 and end hosts EH3 and EH4 and network rack 113 may include edge switch E3 and end host EH6. Edge switches E1, E2, E3, and E4 may serve as top-of-rack switches that are coupled via network paths to each end host of the corresponding network rack. For example, top-of-rack switch E4 is connected to each of the end hosts of network rack 112 (e.g., end hosts EH3 and EH4).

Each top-of-rack switch serves as an interface between end hosts of the corresponding network rack and other network devices such as other portions of network 100 or other networks 102. Network traffic to or from end hosts of network rack 110 may be required to traverse at least one of the top-of-rack switches of network rack 110 (e.g., top-of-rack switches E1 and E2). Similarly, network traffic of network rack 112 may be required to traverse switch E4. As an example, network packets sent by end host EH1 to end host EH3 may be forwarded by top-of-rack switch E1, core switch C1, and top-of-rack switch E4. As another example, network packets sent by end host EH1 to end host EH3 may be forwarded by top-of-rack switch E2, core switch C3, and top-of-rack switch E4.

If desired, switches may be implemented using computing equipment of network racks 110 and 112. Switch E5 may be implemented using computing equipment such as a line card of network rack 110. Software switch E5 may sometimes be referred to as a hypervisor switch. Hypervisor switches may be implemented using dedicated circuitry or using software on discrete computing equipment (e.g., on a line card). However, such software switches are coupled to the rest of the network by cables plugged into dedicated physical ports of the computing equipment on which the software switch is implemented.

Switch E5 may interface with end hosts such as end host EH5 that are implemented on the same computing equipment as switch E5. In other words, shared computing equipment may be used to implement switch E5 and end host EH5. If desired, multiple end hosts may be implemented in software on the shared computing equipment. For example, tens, hundreds, thousands, or more end hosts may be implemented on the shared computing equipment and logically coupled in software to logical ports of software switch E5, whereas software switch E5 is connected to network 100 by physical ports of the computing equipment on which software switch E5 is implemented.

As shown in FIG. 7, controller 18 may be implemented in network rack 110 (e.g., using the resources of a line card or other computing equipment of network rack 110). Controller 18 may communicate with the top-of-rack switches and core switches by sending and receiving control packets from the switches over a network control plane. In this scenario, one or more switches of network 100 may form portions of control paths 66 of FIG. 6. For example, switch E1 or switch E2 may serve as part of control paths between core switches C1 and C2 and controller 18. As another example, switches E1, E2, C1, C2, and C3 may form portions of control paths between controller 18 and switches E3 and E4.

Edge switches such as E1, E2, E3, and E4 that are coupled to end hosts are sometimes referred to as leaf switches. For example, top-of-rack switches in a rack-based system are sometimes referred to as leaf switches. Switches 114 that are coupled to each of the leaf switches are sometimes referred to as spine switches. Spine switches may be core switches that are not connected to any end hosts (e.g., as shown in FIG. 7) or may have one or more ports that are connected to end hosts.

Figure 8:
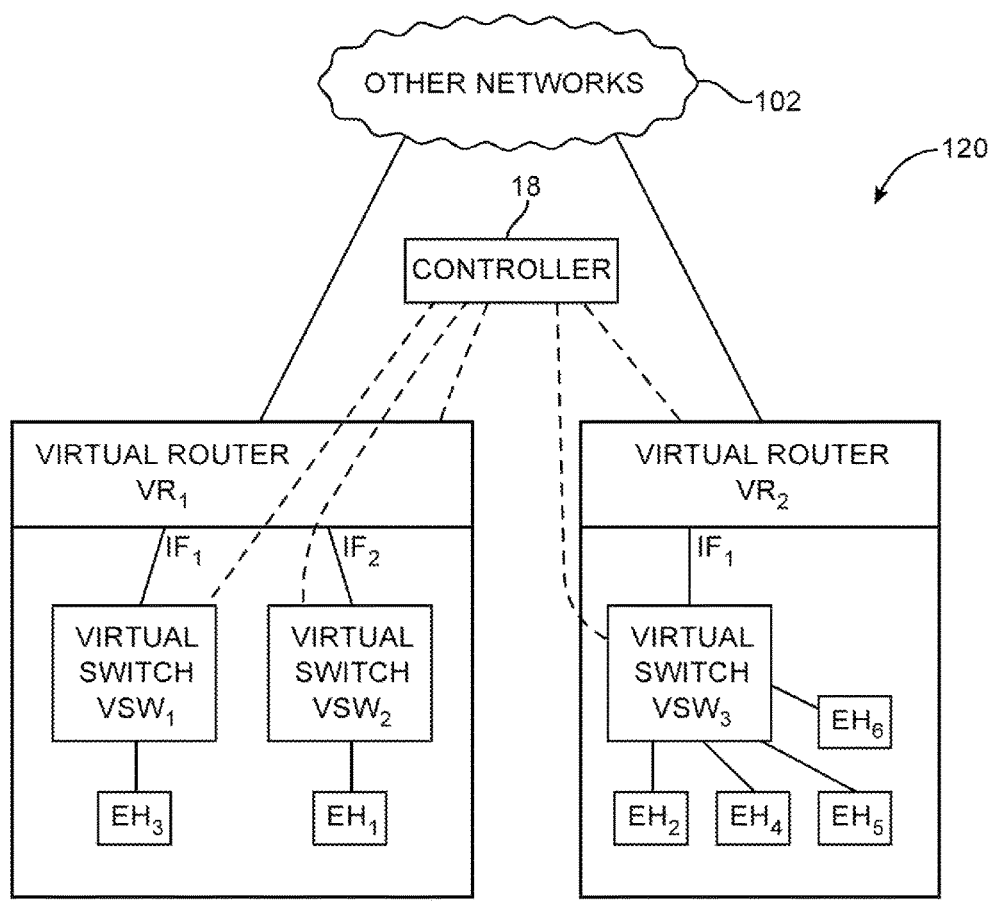
FIG. 8 is a diagram of an illustrative virtual network that may be generated by a controller from the network of FIG. 6 in accordance with an embodiment of the present invention.

It can be challenging for a user such as network administrator to configure network 100 for desired operations. For example, it can be desirable to isolate or otherwise limit communications between groups of end hosts. As another example, it can be inefficient for a network administer to manually configure network policy or routing rules for each switch and each end host of the network. Controller 18 may be configured to implement a logical network topology of virtual routers and virtual switches over the underlying physical network topology. The logical network topology may provide benefits such as improved network configuration efficiency, flexibility, and capabilities. FIG. 8 is an illustrative example in which controller 18 is configured to implement a virtual network 120 from the underlying network 100 of FIGS. 6 and 7.

The virtual network topology of virtual network 120 may be any desired topology within the physical constraints of underlying network 100 (e.g., each virtual path has at least one if not more corresponding paths in the underlying network). The underlying network may include physical switches and/or software-based switches such as hypervisor switch E5.

As shown in FIG. 8, virtual network topology 120 may include virtual switches such as virtual switches VSW1, VSW2, and VSW3 and virtual routers such as virtual routers VR1 and VR2. Virtual switches are formed from groups of end hosts of the network and may be defined by any desired network attributes of the end hosts. Virtual switch VSW1 may be assigned end host EH3, virtual switch VSW2 may be assigned end host EH1, and virtual switch VSW3 may be assigned end hosts EH2, EH4, EH5, and EH6.

Each virtual switch may be implemented as a distributed logical switch across one or more underlying switches (e.g., underlying physical or hypervisor switches). For example, virtual switches may include end hosts that are attached to different physical switches. In this scenario, the controller may control multiple physical switches in controlling a single virtual switch. Control of different virtual switches may involve controlling two sets of potentially overlapping sets of underlying physical and/or hypervisor switches (e.g., a physical switch may be controlled in performing operations associated with different virtual switches).

Examples of network attributes that may be used in characterizing an end host include the physical or hypervisor switch port to which the end host is coupled, a hardware address of the end host (e.g., a MAC address), a protocol address of the end host (e.g., an IP address), a virtual local area network (VLAN) tag, and/or other network attributes of the end host. For example, controller 18 may identify end host EH1 as attached to port P1 of switch E1, may identify end hosts EH2 and EH3 by MAC address, and may identify end host EH4 as attached for port P2 of switch E3. As another example, end host EH5 may be identified as attached to logical port P1 of hypervisor switch E5. This example is merely illustrative. Any desired network attribute such as used in network packet header fields or any desired combination of network attributes may be used in forming virtual switches.

Virtual switches may be grouped to form virtual routers. In the example of FIG. 8, virtual switches VSW1 and VSW2 are grouped to form virtual router VR1, whereas virtual switch VSW3 is assigned to virtual router VR2. In other words, the groups of end hosts of virtual switches VSW1 and VSW2 are assigned to virtual router VR1, whereas the group of end hosts of virtual switch VSW3 is assigned to virtual router VR2. Each virtual switch is connected to the corresponding virtual router via a virtual router interface. Virtual switches VSW1 and VSW2 are connected to respective virtual router interfaces IF1 and IF2 of virtual router VR1, whereas virtual switch VSW3 is connected to virtual router interface IF1 of virtual router VR2.

Each virtual switch serves to implement a respective broadcast domain in which broadcast network packets are forwarded to all end hosts of the virtual switch. The broadcast network packets may be network packets having header fields identifying the network packets as broadcast network packets that are destined for all end hosts of an associated broadcast domain. For example, broadcast network packets received by virtual switch VSW3 from end host EH2 may be forwarded by virtual switch VSW3 to each other end host that is assigned to virtual switch VSW3 (i.e., to end hosts EH4, EH5, and EH6).

Virtual routers perform network routing functions and provide isolation for the different broadcast domains of the virtual switches. For example, virtual router VR1 may prevent broadcast packets from being forwarded by virtual switch VSW1 to virtual switch VSW2 (and vice versa). The broadcast domains may be defined in terms of IP address ranges such that each interface of a given virtual router is assigned a different respective IP address range. For example, a first IP address range may be assigned to interface IF1 and virtual switch VSW1, whereas a second IP address range may be assigned to interface IF2 and virtual switch VSW2. In contrast to virtual routers, virtual switches do not perform any network routing functions based on IP domains.

Network routing functions that may be performed by a virtual router include modifying headers of network packets received at interfaces of the virtual router. The virtual router may decrement a time-to-live IP header field of the network packet. The virtual router may modify Ethernet headers such as source and destination MAC address fields to correspond with a desired broadcast domain. For example, each interface of the virtual router may be assigned a respective Ethernet address. In this scenario, the virtual router may rewrite the source MAC address fields to match the egress (outgoing) interface of the virtual router. The virtual router may rewrite the destination MAC address field to match a next-hop address.

Figure 9:
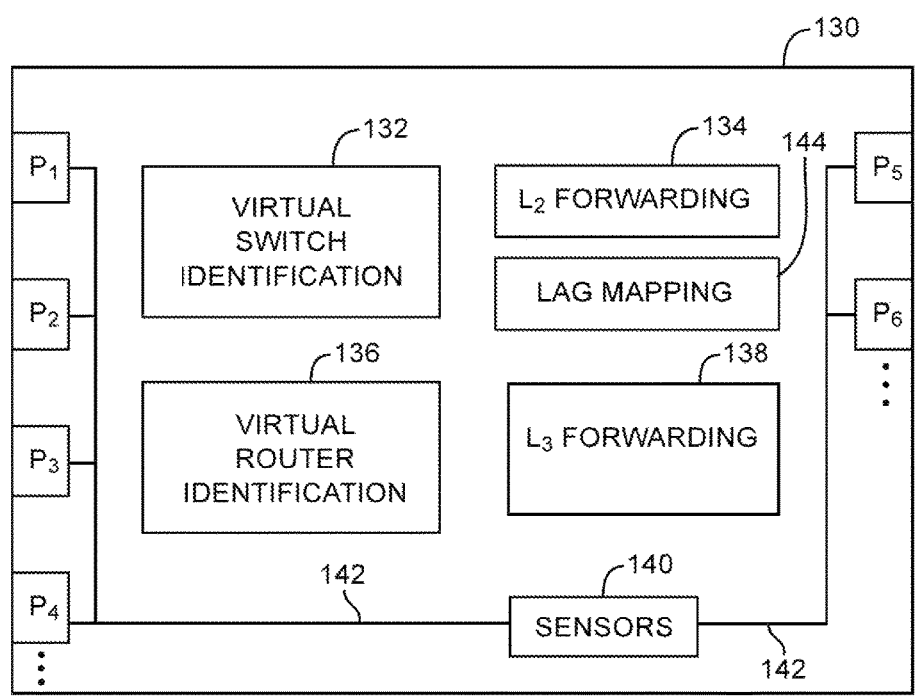
FIG. 9 is a diagram of an illustrative switch having modules that each perform a subset of packet forwarding operations and may be configured by a controller to perform link aggregation failover in accordance with an embodiment of the present invention.

FIG. 9 is an illustrative block diagram of a switch 130 such as a physical or hypervisor switch. Switch 130 may, for example, be an edge switch such as edge switch E1, E2, E3, or E4 of FIG. 6 or may be a core switch such as switches C1, C2, or C3. As shown in FIG. 9, switch 130 may include ports such as ports P1, P2, P3, P4, P5, P6, etc. Switch 130 may include virtual switch identification module 132, L2 forwarding module 134, virtual router identification module 136, and L3 forwarding module 138. The modules may be implemented using respective dedicated circuitry, may be implemented using shared dedicated circuitry, or may be implemented using software on processing circuitry. For example, these modules may be implemented using packet processing software 26 of FIG. 1 and/or packet processing circuitry 32. The processing modules of switch 130 may perform functions based on flow table entries provided by a controller. In other words, the flow table entries may be partitioned into portions having respective actions to be taken and provided to respective processing modules of switch 130.

A network packet received at one of the switch ports may be processed by one or more of the modules in determining how to forward the network packet. The modules may process the network packet in any desired sequence or in parallel. The operations performed by each module may be controlled by a controller.

Virtual switch identification module 132 may determine which virtual switch the network packet is assigned to based on network attributes associated with the network packet (e.g., incoming port, source address information such as Ethernet or IP source address, etc.). Module 132 may provide information identifying the virtual switch to L2 forwarding module 134. L2 forwarding module 134 may perform network forwarding based on the virtual switch information provided by module 132 (e.g., forwarding decisions at layer 2 of the Open Systems Interconnection "OSI" model). For example, L2 forwarding module 134 may determine which switch port the network packet should be forwarded to based on the virtual switch information and additional packet information such as a destination MAC address retrieved from the network packet.

Switch ports may include physical or logical switch ports. If desired, a group of switch ports may serve as a logical switch port for layer 2 forwarding. For example, the switch may implement link aggregation that assigns a link aggregation group (LAG) to groups of ports of the switch. LAG mapping module 144 may maintain databases or tables that identify mappings between link aggregation groups and switch ports. L2 forwarding module 134 may identify link aggregation groups instead of switch ports when performing L2 forwarding. Switch 130 may perform optimizations such as traffic balancing between the switch ports of a link aggregation group.

In scenarios such as when destination end host is associated with a different virtual switch than the source end host, virtual router identification module 136 and L3 forwarding module 138 may be used. For example, network packets received by switch E4 from end host EH3 that are destined for end host EH1 may be processed using L3 forwarding module 138, because end host EH3 is assigned to virtual switch VSW1, whereas end host EH1 is assigned to virtual switch VSW2. In other words, the IP domain of interface IF1 that is associated with end host EH3 is different from the IP domain of interface IF2 that is associated with end host EH1. In these scenarios, network routing at the IP layer (e.g., level 3 of the OSI model) may be required.

Virtual router identification module 136 may identify which virtual router should be used in controlling the network packet. Module 136 may use network attributes of the network packet along with information received from other modules of the switch. For example, module 136 may use identified virtual switch information received from L2 forwarding module 134 along with IP address information retrieved from the network packet in determining which virtual router controls the network packet.

Virtual router identification module 136 may provide identified virtual router information to L3 forwarding module 138. L3 forwarding module 138 may perform network routing operations based on the identified virtual router information and based on additional information retrieved from the network packet. As an example, L3 forwarding module 138 may use IP header fields such as destination address fields to determine which port of the switch should be used in forwarding the network packet. In performing network routing operations, L3 forwarding module 138 may modify the network packet. For example, module 138 may decrement a TTL header field and may rewrite layer 2 header fields such as source and destination MAC addresses.

Consider the scenario in which a network packet received at switch E2 from end host EH1 is destined for end host EH3. In this scenario, the network packet may include the MAC address of end host EH1 as a source MAC address, the MAC address of virtual router VR1 as the destination MAC address (because end host EH1 is coupled to a different L3 interface of virtual router VR1 than end host EH3 and does not have access to the MAC address of end host EH3), the IP address of end host EH1 as a source IP address, and the IP address of end host EH3 as a destination IP address. Virtual router identification module 136 may determine that the source end host (EH1) is coupled to interface IF2 of virtual router VR1 via virtual switch VSW2 (e.g., based on flow table entries provided by a controller). L3 forwarding module 138 may determine that destination end host EH3 is coupled to interface IF1 of virtual router VR1 and perform network routing operations in routing the network packet to end host EH3 via interface IF1 of virtual router VR1 (e.g., based on flow table entries provided by a controller). The network routing operations may include decrementing a TTL field of the network packet and rewriting the source and destination MAC addresses of the packet. In particular, the source MAC address may be rewritten from the MAC address of end host EH1 to the MAC address of interface IF1 of virtual router VR1, whereas the destination MAC address may be rewritten from the MAC address of interface IF2 of virtual router VR1 to the MAC address of end host EH3.

The modules of the switch may collectively implement a flow table such as flow table 28 for the switch. For example, flow table entries or portions of the flow table entries operating only on layer 2 header fields may be implemented using virtual switch identification module 132 and L2 forwarding module 134. As another example, flow table entries or portions of the flow table entries operating only on layer 3 header fields may be implemented using virtual router identification module 136 and L3 forwarding module 138. As yet another example, flow table entries operating on both layer 2 and layer 3 header fields may be implemented using identification module 132, L2 forwarding module 134, virtual router identification module 136 and L3 forwarding module 138.

Switch 130 may include one or more sensors 140 that are coupled to the switch ports via paths 142. Sensors 140 may monitor the ports to identify port failure. For example, sensors 140 may include electrical sensors that monitor electrical connections between the ports and other switches or network devices. The sensors may determine whether cables have been unplugged or connections are faulty. A controller may configure switch 130 to take appropriate actions such as sending an error message to the controller or adjusting a network forwarding module such as L2 forwarding module 134 to avoid use of failed ports.

The example of FIG. 9 in which modules 132, 134, 136, and 138 are implemented separately is merely illustrative. If desired, the functions of any two or more modules may be merged and implemented using shared circuitry. The modules may be implemented as software modules in a software switch such as hypervisor switch E5 of FIG. 7 or may be implemented using dedicated circuitry. Each switch 130 may be capable of performing both network forwarding and network routing, which helps to allow a controller to implement distributed virtual switches and virtual routers.

Figures 10, 11:
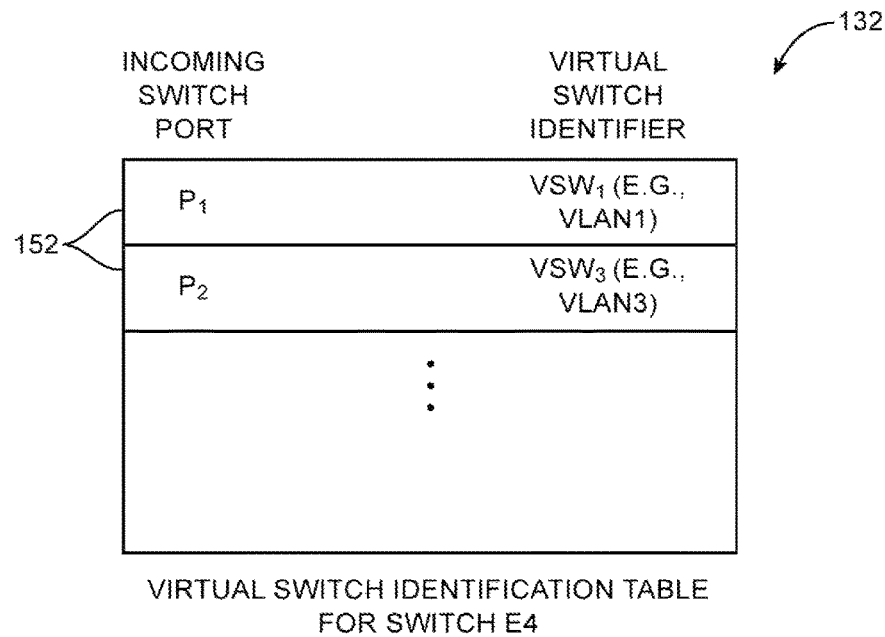
FIG. 10 is a diagram of an illustrative virtual switch identification module implemented as a table in accordance with an embodiment of the present invention.
FIG. 11 is a diagram of an illustrative forwarding table that may be configured by a controller for link aggregation failover in accordance with an embodiment of the present invention.

FIG. 10 illustrates how virtual switch identification module 132 may be implemented as a table. In the example of FIG. 10, virtual switch identification table 132 may be implemented at switch E4 of FIG. 6 in the context of the virtual topology of FIG. 8. In this example, virtual switch identification table 132 may include entries 152 that a controller has provided to switch E4 for assigning virtual switch identifiers to incoming packets.

Each virtual switch identification entry 152 may identify end hosts and a virtual switch identifier to assign to network packets matching the identified end hosts. In the example of FIG. 10, end hosts may be identified by the switch ports at which network packets are received. End host EH3 may be identified as attached to port P1 of switch E4, whereas end host EH4 may be identified as attached to port P2 of switch E4. A first entry 152 associated with end host EH3 may match network packets received at switch port P1 and assign virtual switch identifier VSW1 to the matching network packets (e.g., because end host EH3 belongs to virtual switch VSW1 as shown in FIG. 8). A second entry 152 associated with end host EH4 may match network packets received at switch port P2 and assign virtual switch identifier VSW3 to the matching network packets (e.g., because end host EH4 belongs to virtual switch VSW3).

In some scenarios, the virtual switch identifier may be stored in the network packets. For example, VLAN tags may be used as virtual switch identifiers and network packets may be assigned the appropriate VLAN tags based on incoming switch port. The VLAN tags stored using virtual switch identification table 132 at a given switch may be used by other switches for packet forwarding operations.

Virtual switch identifiers assigned to network packets may be used in L2 packet forwarding operations. FIG. 11 is an illustrative diagram of an L2 forwarding module 134 implemented as a table. L2 forwarding table 134 may include L2 forwarding table entries 162. FIG. 11 includes entries for virtual switch VSW3 that are provided to switch E4, but is merely illustrative. L2 forwarding table 134 may include entries for any and multiple desired virtual switches (e.g., so that switch E4 serves to implement part of multiple distributed virtual switches).

Each L2 forwarding table entry 162 may identify network packets based on layer 2 information retrieved from or assigned to the network packets and may determine an action to be taken for the identified network packets. In the example of FIG. 11, each forwarding table entry 162 identifies network packets by assigned virtual switch identifier (e.g., from a virtual switch identification module or retrieved from header fields from the network packets) and layer 2 destination information retrieved from the network packets (e.g., destination Ethernet addresses).

A first table entry 162-1 may identify network packets that are assigned virtual switch identifier VSW3 and destined for Ethernet address MACEH3. The first table entry may direct switch E4 to perform L3 forwarding, because end host EH3 is assigned to virtual switch VSW1 and not part of virtual switch VSW3. Similarly, table entry 162-2 may direct switch E4 to perform L3 forwarding for network packets assigned to virtual switch identifier VSW3 that are destined for end host EH1 (e.g., having Ethernet address MACEH1), because end host EH1 does not belong to virtual switch VSW3. Layer 3 (e.g., IP) forwarding performed by virtual router VR1 may be required for communications between virtual switches VSW1 and VSW3. Switch E4 may perform L3 forwarding using L3 forwarding module 138 of FIG. 9.

The virtual switch identifier of a network packet may effectively identify the virtual switch of the source end host that sent the network packet. For network packets with destination end hosts of the same virtual switch as the source end hosts, L2 forwarding table entries 162 may be provided that forward the network packets to appropriate switch ports (e.g., L3 forwarding may not be necessary). For example, table entry 162-4 may direct switch E4 to send network packets destined for end host EH4 to port P1 of switch E4. In scenarios in which link aggregation groups are available for forwarding, forwarding table entries 162 may direct the switch to forward network packets to the link aggregation groups. For example, table entries 162-3, 162-5, and 162-6 may direct switch E4 to send network packets destined to end hosts EH2, EH5, and EH6 to link aggregation group LAG1.

Figure 12:
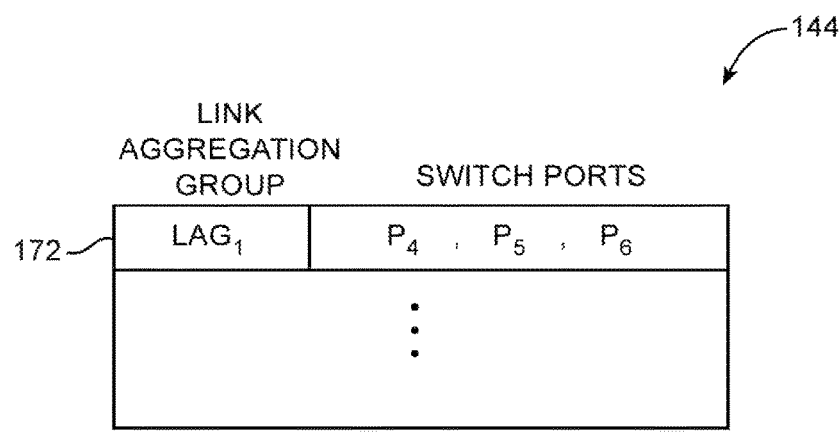
FIG. 12 is a diagram of an illustrative link aggregation table of a switch that may be configured by a controller for link aggregation failover in accordance with an embodiment of the present invention.

FIG. 12 is an illustrative diagram of a link aggregation module 144 that includes link aggregation mappings for switch E4. As shown in FIG. 12, link aggregation table 144 includes link aggregation table entry 172. Table entry 172 identifies that switch ports P4, P5, and P6 of switch E4 are mapped to link aggregation group LAG1. When L2 forwarding module 134 determines that a network packet should be forwarded to link aggregation group LAG1, the corresponding entry of link aggregation table 144 is used to determine that the network packet should be forwarded to one of switch ports P4, P5, or P6.

Each link aggregation group that is determined by a controller for a switch may be updated by that switch in response to port failures. Consider the scenario for FIG. 6 in which port P6 of switch E3 fails. In other words, the connection between switch C3 and switch E3 has failed. In this scenario, a sensor 140 at switch E3 that monitors port P6 of switch E3 may determine that the port has failed. Switch E3 may update its link aggregation table 144 to reflect the port failure by removing port P6 from all table entries. Similarly, switch C1 may identify the port failure and update its respective link aggregation table 144. However, other switches in the network may remain unaware of the connection failure between switches C3 and E3. For example, switch E4 does not have any sensors capable of monitoring a connection between switches E3 and C3.

Figure 13A:
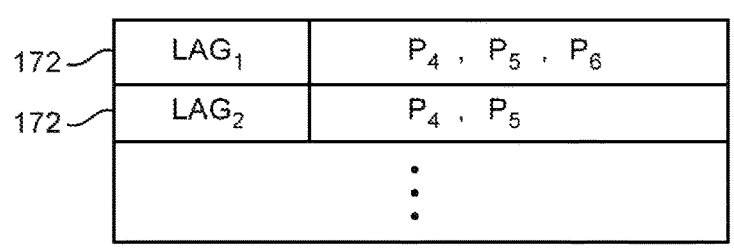
FIG. 13A is an illustrative diagram showing how a link aggregation table may be configured to include an entry that avoids paths through a switch that has a failed port in accordance with an embodiment of the present invention.

Controller 18 may use network topology information to control the switches for improved handling of link aggregation port failure. In the scenario in which the connection between switches C3 and E3 fails, controller 18 may update the link aggregation table of switch E4 as shown in FIG. 13A. Controller 18 may provide an additional table entry 172 to switch E4 that defines a new link aggregation group LAG2 including only ports P4 and P5 of switch E4. Link aggregation group LAG2 does not include port P6 that connects switch E4 to switch C3 and therefore packets forwarded through link aggregation group LAG2 avoid the connection failure between switches C3 and E3 (e.g., avoiding network paths that include switch E3 that has a failed port).

Figure 13B:
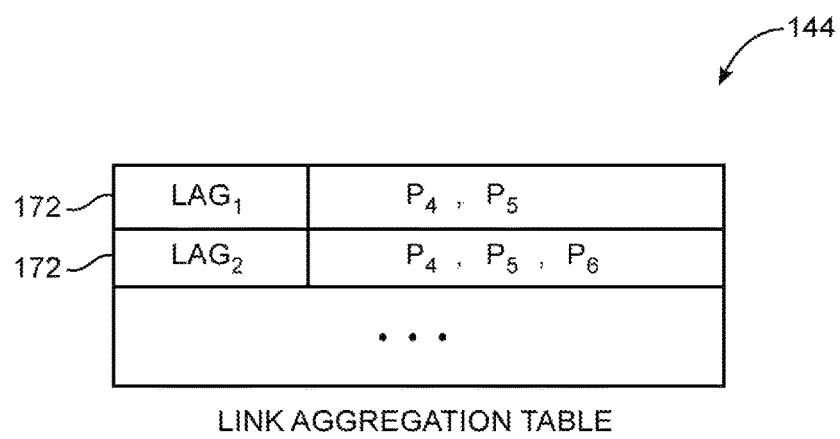
FIG. 13B is an illustrative diagram showing how a link aggregation table may be configured by modifying an existing entry to avoid paths through a switch that has a failed port in accordance with an embodiment of the present invention.

The example of FIG. 13A in which the controller adds a new link aggregation table entry that accommodates port failure is merely illustrative. As shown in FIG. 13B, the controller may configure the link aggregation table by modifying the existing table entry for link aggregation group LAG1 to remove any ports that are coupled to switch E3 that has a failed port (e.g., removing port P6 of switch E4). In this scenario, the controller may add an additional table entry that includes port P6 that is coupled to switch E3.

Figure 14:
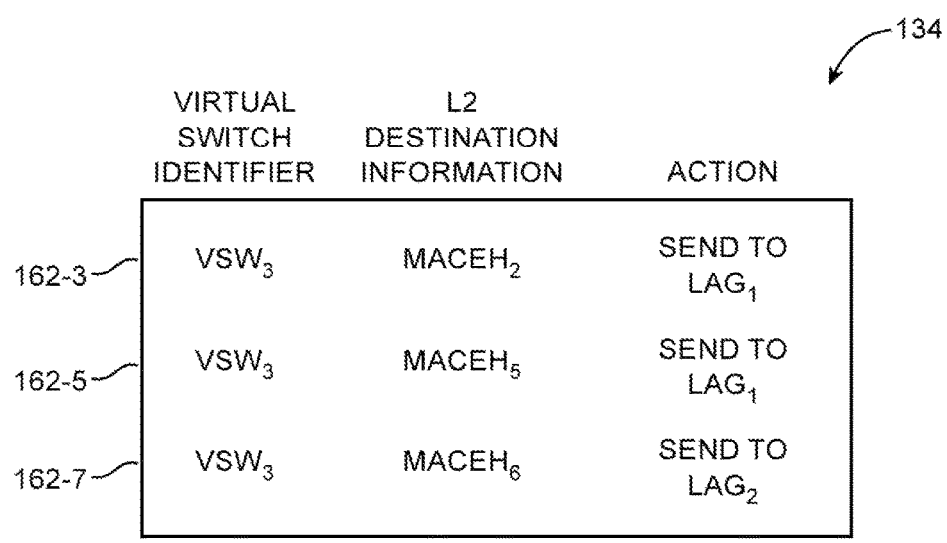
FIG. 14 is a diagram of an illustrative forwarding table of a switch that may be configured by a controller to use a link aggregation table for link aggregation failover in accordance with an embodiment of the present invention.

As shown in FIG. 14, controller 18 may modify the entries of L2 forwarding table 134 of switch E4 for efficient utilization of modified link aggregation table 144 in the scenario that the connection between switches C3 and E3 of FIG. 6 has failed. The example of FIG. 14 is described in the context of link aggregation table 144 of FIG. 13A.

Based on network topology information maintained by controller 18, the controller may determine that switch E4 cannot reach end host EH6 through switch C3 (e.g., because switch C3 can only reach end host EH6 through the failed link to switch E3). Controller 18 may therefore provide entry 162-7 to switch E4 that directs switch E4 to forward network packets associated with virtual switch VSW3 and destined for end host EH6 through link aggregation group LAG2. Referring back to FIG. 13A, link aggregation group LAG2 maps to ports P4 and P5 of switch E4 and therefore network packets destined for end host EH6 are routed through switches C1 or C2 (and not C1). In contrast, L2 forwarding table entries 162-3 and 162-5 may remain mapped to link aggregation group LAG1, because end hosts EH2 and EH5 are still reachable through switch C1. The example of FIG. 14 is merely illustrative. If desired, forwarding table entries may forward to link aggregation groups as appropriate for the modifications made to the link aggregation table (e.g., LAG1 and LAG2 may be swapped for table 144 of FIG. 13B).

Figure 15:
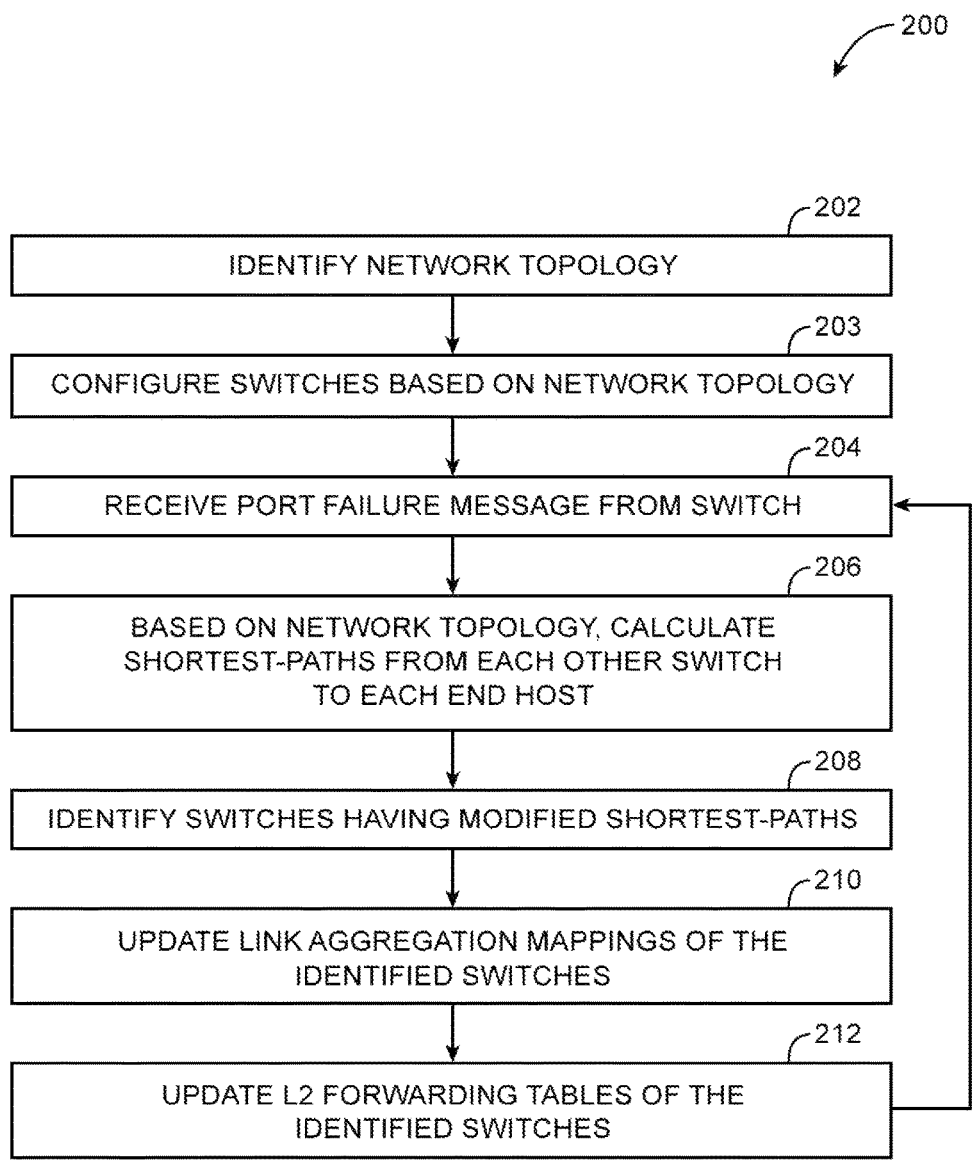
FIG. 15 is a flowchart of illustrative steps that may be performed by a controller in configuring switches to perform link aggregation failover in accordance with an embodiment of the present invention.

Controller 18 may modify the link aggregation tables and L2 forwarding table entries for any or all switches in a network to handle link aggregation port failover. FIG. 15 is a flowchart 200 of illustrative steps that may be performed by a controller such as controller 18 in controlling switches of a network to handle link aggregation port failover.

During step 202, the controller may identify the topology of the network of switches. For example, the controller may communicate with the switches to identify connections between ports of the switches and connections between the switches and end hosts. The controller may calculate shortest-paths between each switch and end host for implementing network forwarding paths. Referring to FIG. 6, controller 18 may calculate the shortest-paths between switch E4 and end hosts EH1, EH2, EH3, EH4, EH5, and EH6, between switch E1 and the end hosts, etc. Shortest paths may be calculated based on distance, latency, or any desired metrics such as available bandwidth, processing load at the switches, or other network metrics.

During step 203, the controller may configure the switches based on the network topology. For example, the controller may send control messages to the switches that configure link aggregation tables and forwarding tables to forward network packets along the calculated shortest-paths based on the network topology.

During step 204, the controller may receive a port failure message from a switch. The port failure message may be received from the switch over network control paths such as control paths 66 of FIG. 6. The port failure message may identify the switch port that has failed. During step 206, the controller may calculate shortest-paths from each other switch to each end host. The shortest-paths may be calculated using any desired shortest-path algorithm such as Dijkstra's algorithm. During step 208, the controller may determine which switches have shortest-paths to end hosts that have been affected by the port failure. During step 210, the controller may update the link aggregation mappings of the identified switches. For example, the controller may send control packets to each of the identified switches that modify the link aggregation tables of the identified switches to include updated link aggregation groups. During step 212, the controller may update the L2 forwarding tables of the identified switches to use the updated link aggregation groups.

As an example, in the scenario in which the link between switches C3 and E3 fails, the controller may receive a port failure message from switch E3 indicating that port P6 of switch E3 has failed (step 204). The controller may calculate shortest-paths between each other switch (e.g., E1, E2, E4, C1, C2, and C3) and each end host (e.g., EH1, EH2, EH3, EH4, EH5, and EH6) during step 206. The controller may identify switches having modified shortest-paths to end hosts during step 208 (e.g., potentially all of the other switches). The controller may update the link aggregation mappings of the identified switches during step 210 (e.g., link aggregation table 144 of switch E4 may be updated as shown in FIG. 13A or FIG. 13B and other switches may be updated similarly). The controller may also update the L2 forwarding tables of switch E4 (e.g., as described in connection with FIG. 14) and the other identified switches during step 212 to efficiently utilize the updated link aggregation mappings.

Figure 16:
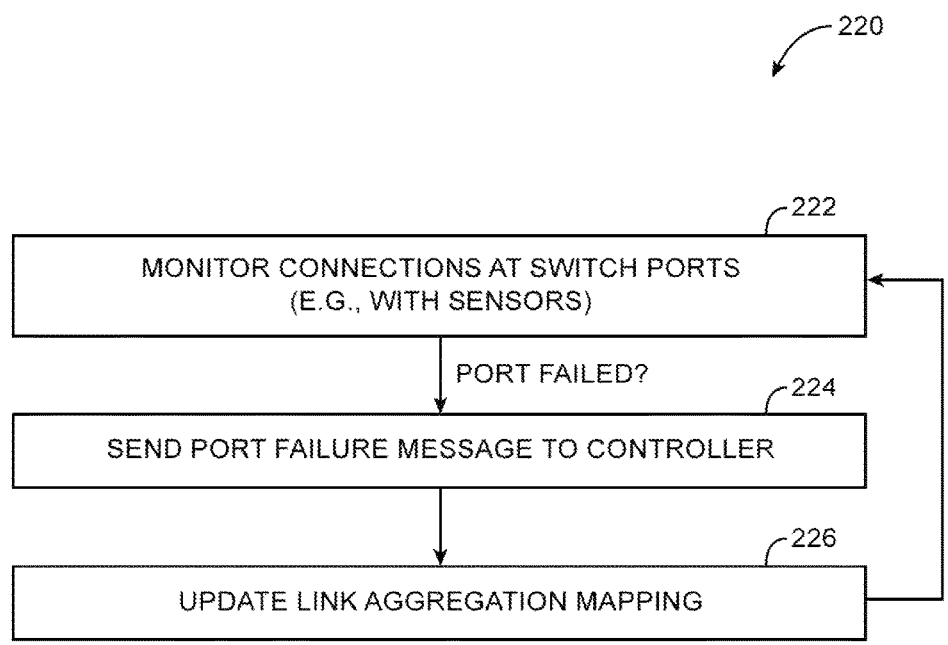
FIG. 16 is a flowchart of illustrative steps that may be performed by a switch that has been configured by a controller to provide port failure information in accordance with an embodiment of the present invention.

FIG. 16 is a flow chart 220 of illustrative steps that may be performed by a switch in communicating with a controller for link aggregation group port failover handling. The switch may perform the steps of flow chart 220 in parallel (e.g., simultaneously) with packet forwarding operations.

During step 222, the switch may monitor connections at ports of the switch. For example, the switch may use sensors 140 of FIG. 9 to monitor electrical connections between the ports and other network devices. In response to determining that a previously connected port has failed (e.g., a connection was lost), the operations of step 224 may be performed. During step 224, the switch may send a port failure message to the controller. The port failure message may identify the switch and the port that has failed. During step 226, the switch may update its own link aggregation mappings by removing the failed port from any link aggregation groups. For example, the switch may remove any instances of the failed port from entries 172 of link aggregation table 144 of FIG. 12.

Figure 17:
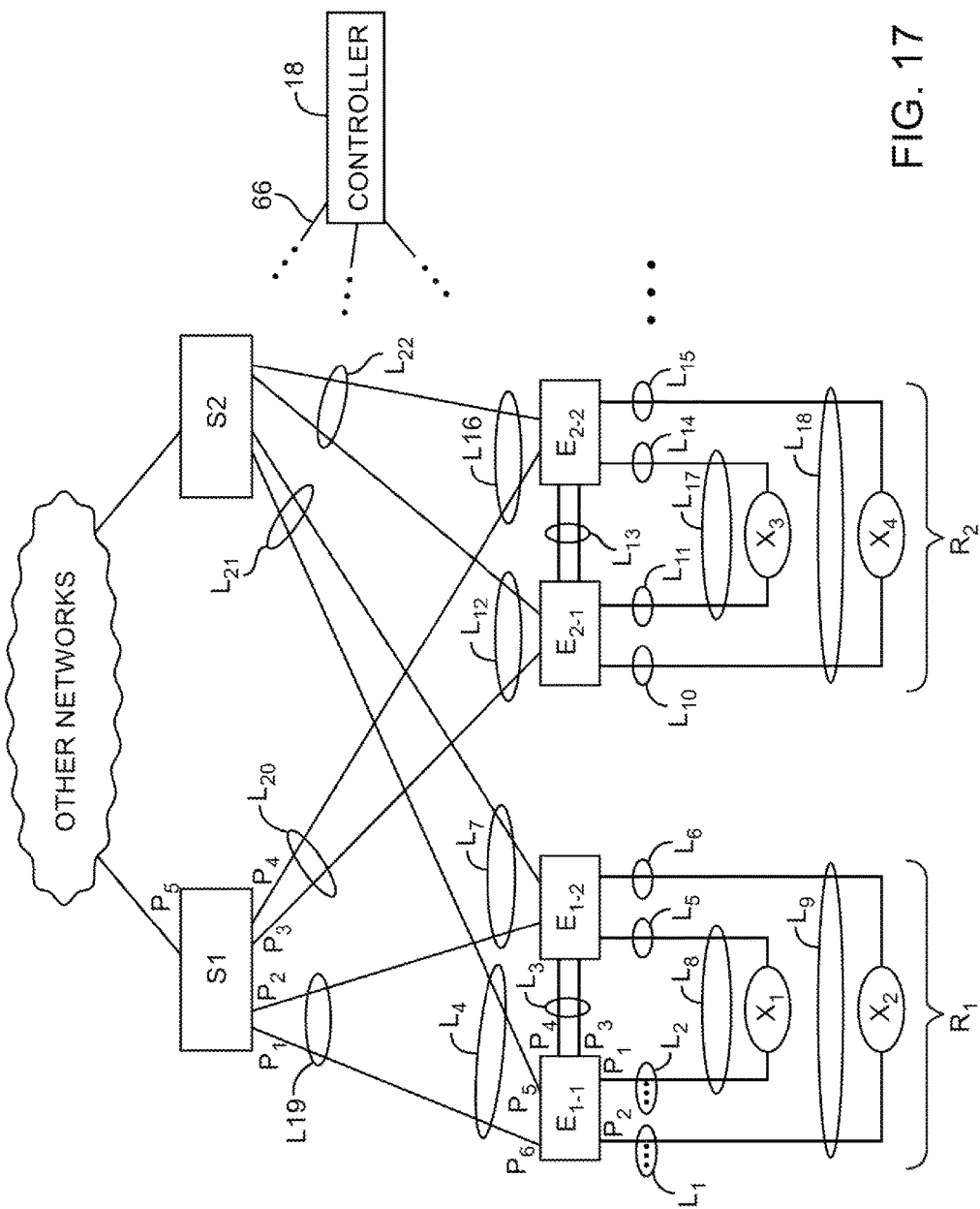
FIG. 17 is a diagram of a rack-based network in which a controller configures switches with link aggregation groups in accordance with an embodiment of the present invention.

Link aggregation groups (LAGs) may be formed from any desired sets of ports of a network element. FIG. 17 is an illustrative diagram of a rack-based network in which sets of ports may be assigned to different LAG groups. As shown in FIG. 17, rack R1 may include top-of-rack switches E1-1, E1-2 (e.g., edge switches) and servers X1 and X2, whereas rack R2 may include top-of-rack switches E2-1 and E2-2 and servers X3 and X4. In the example of FIG. 17, servers X3 and X4 are configured to implement software switches and end hosts. This example is merely illustrative. Each server may be configured to implement any desired number of end hosts and/or a software switch that interfaces between the end hosts and other switches. Switches in the rack-based network such as switches S1, S2, E1-1, E1-2, software switches on servers X1 and X2, etc. may be controlled by controller 18 via control paths 66.

Controller 18 may configure the switches in the network to implement LAG groups L1-L18 between portions of the network. Each LAG group may be formed from a group of switch ports. For example, LAG group L1 includes port P1 of switch E1-1, LAG group L3 includes ports P4 and P3 of switch E1-1, and LAG group L4 includes ports P5 and P6 of switch E1-1.

Leaf switches E1-1, E1-2, E2-1, and E2-2 may be configured by controller 18 with LAG groups L1, L2, L3, L4, L5, L6, L7, L10, L11, L12, L13, L14, L15, and L16.

For each leaf (e.g., top-of-rack) switch, LAG groups that are coupled to servers of the corresponding rack may be referred to as downstream LAG groups. For example, LAG groups L1, L2, L5, L6, L10, L11, L14, and L15 may be referred to as downstream LAG groups.

LAG groups that connect leaf (e.g., top-of-rack) switches within the same rack may be referred to as peer groups or peer LAG groups (e.g., LAG group L3 serves as a peer group for top-of-rack switches E1-1 and E1-2, whereas LAG group L13 serves as a peer group between switches E2-1 and E2-2).

LAG groups that couple leaf switches of a first rack to a second rack through core (spine) switches may be referred to herein as leaf rack LAG groups or rack-to-rack LAG groups. For example, LAG group L4 serves as a leaf rack LAG group that connects leaf switch E1-1 to rack R2. As another example, LAG group L12 serves as a leaf rack LAG group that connects leaf switch E2-1 to rack R1. As another example, LAG group LAG1 of FIG. 13A serves as a leaf rack LAG group that connects leaf switch E4 of FIG. 7 to rack 110, whereas LAG group LAG2 serves as a leaf rack LAG group that connects leaf switch E4 to rack 113. In scenarios such as when additional racks are connected to the network, each leaf switch may be configured to implement additional leaf rack LAG groups (e.g., each leaf of a given rack may implement a leaf rack LAG group for each other rack in the network).

LAG groups that connect core (spine) switches to racks may sometimes be referred to as core (or spine) rack LAG groups. For example, core switch S1 may be configured with core rack LAG group L19 that connects to rack R1 and core rack LAG group L20 that connects to rack R2. Similarly, core switch S2 may be configured with core rack LAG group L21 that connects to rack R1 and core rack LAG group L22 that connects to rack R2. Implementation of core rack LAG groups allows core switches S1 and S2 to be updated with core-to-rack connectivity independently of intra-rack connectivity.

Figure 18:
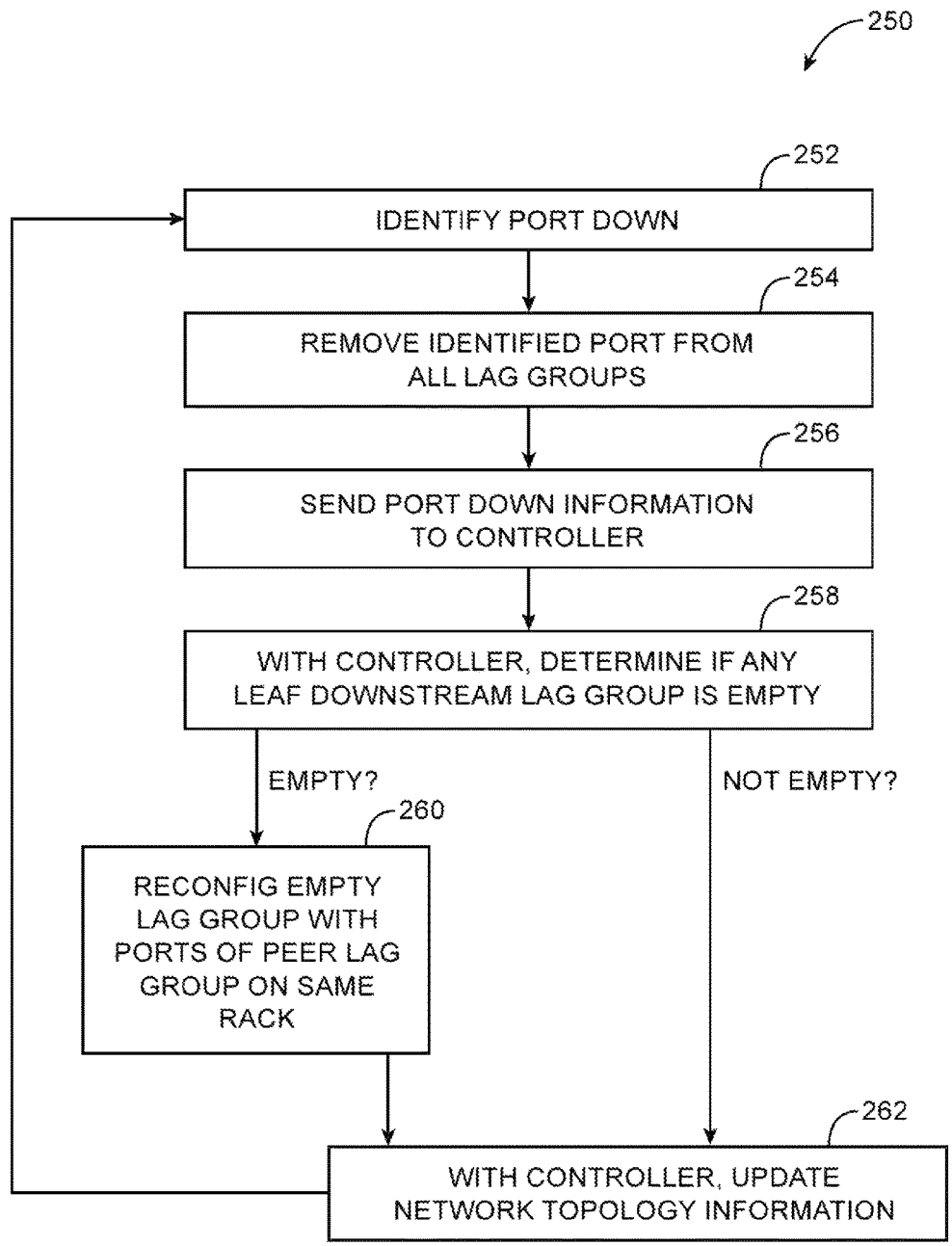
FIG. 18 is a flow chart of illustrative steps that may be performed in handling intra-rack port failures for link aggregation groups in accordance with an embodiment of the present invention.

Downstream LAG groups between leaf switches in a rack and servers of that rack may be dynamically updated based on current connectivity within that rack. FIG. 18 is a flow chart of illustrative steps that may be performed in dynamically updating downstream LAG groups implemented at leaf switches.

During step 252, a switch may identify that a port at the switch has failed (i.e., port down). During subsequent step 254, the switch may remove the identified port from all LAG groups maintained at that switch. During step 256, the switch may send information to the controller that identifies the port failure. During step 258, the controller may determine whether any leaf downstream LAG group at the switch is empty (e.g., due to the port failure). In response to determining that a leaf downstream LAG group is empty, the controller may send a control message to the switch that reconfigures the empty leaf downstream LAG group with ports of a peer LAG on the same rack as the switch. The controller may subsequently update network topology information maintained at the controller during step 262 to identify the changes in port connectivity and LAG group assignments. In response to determining that no leaf downstream LAG group is empty during step 258 (i.e., each leaf downstream LAG group at the switch includes at least one switch port), the controller may proceed directly to step 262.

Consider the scenario in which port P2 of leaf switch E1-1 fails. Leaf switch E1-1 may identify the port down (step 252), remove port P2 from LAG group L1 (step 254), and send the port down information to the controller (step 256). The controller may determine that LAG group L1 is now empty (step 258) and reconfigure LAG group L1 to include ports P3 and P4 of switch E1-1 during step 260 (i.e., the ports of peer LAG group L3). In this scenario, future network packets that are received at switch E1-1 and destined for server X2 are forwarded through leaf switch E1-2 that is still connected to server X2.

The example of FIG. 18 in which the controller reacts to port down messages from switches is merely illustrative. If desired, the controller may proactively provide primary and secondary LAG configurations to the switches. The switches may default to using the primary LAG configuration, but may switch to the secondary LAG configuration in response to determining that the primary LAG configuration is invalid (e.g., when the ports of the primary LAG configuration are removed by the switch due to port failures). For example, a primary LAG configuration for LAG group L1 of switch E1-1 may include downstream port P2, whereas the secondary LAG configuration may include peer link ports P3 and P4.

Figure 19:
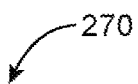
FIG. 19 is a diagram of a link aggregation table for a leaf switch in accordance with an embodiment of the present invention.

FIG. 19 is an illustrative diagram of a link aggregation table 270 maintained at leaf switch E1-1 of FIG. 17. Link aggregation table 270 may include a LAG for each rack other than the rack of switch E1-1 (e.g., LAG L4 for rack R2 that includes ports P5 and P6). Link aggregation table 270 may include intra-rack LAG groups for each server (e.g., L2 for server X1 and L1 for server X2). Table 270 may include peer LAG group L3 identifying connections between switches E1-1 and E1-2 of the same rack.

Switches in the network may receive broadcast packets from an end host that are to be forwarded to each other end host of the network. The switches may be configured (e.g., by a controller) to handle broadcast packet forwarding using LAG groups without redundantly forwarding packets to the same end hosts.

Link aggregation table 270 may include a core (e.g., spine) broadcast LAG group that identifies a set of ports that are connected to core switches that have access to every other rack in the network. In the example of FIG. 19, leaf switch E1-1 of rack R1 may be connected through core switches S1 and S2 and therefore the core broadcast LAG may include ports P5 and P6. As another example, the controller may remove port P5 from the core broadcast LAG of leaf switch E1-1 in the scenario that switch S2 is disconnected from rack R2 (e.g., due to port failures between core switch S2 and rack R2).

Figure 20:
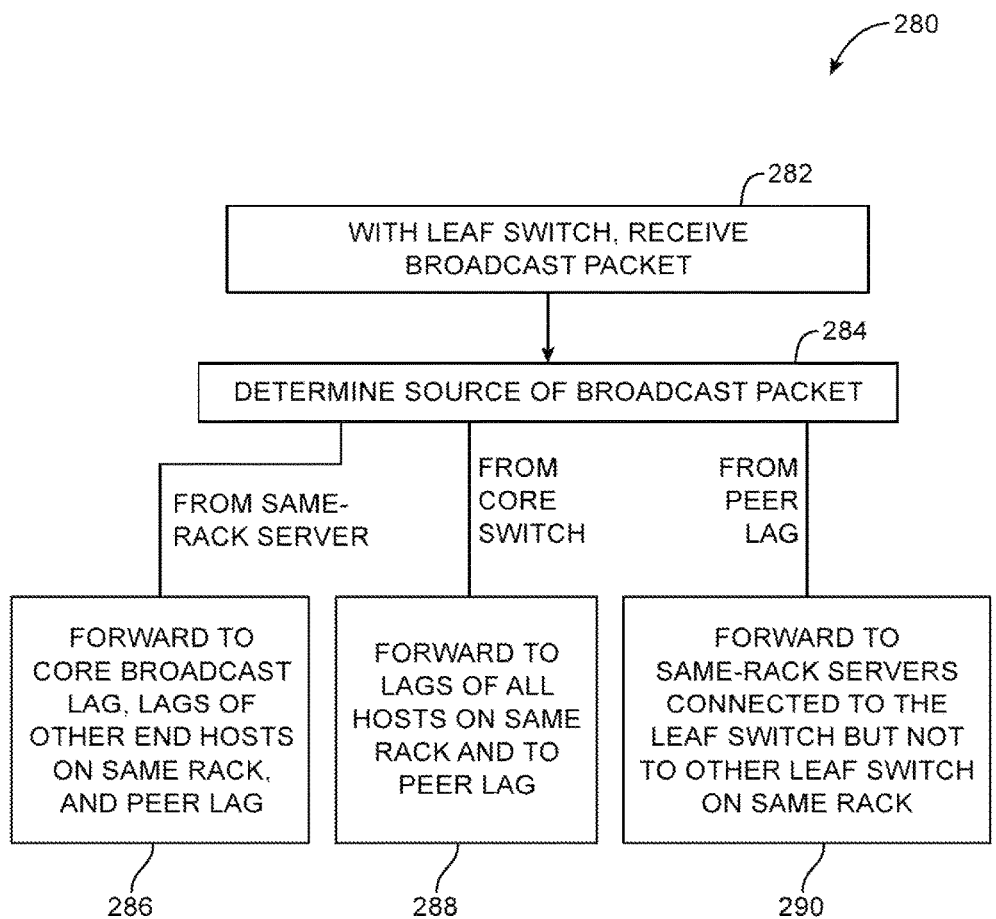
FIG. 20 is a flow chart of illustrative steps that may be performed by a leaf switch in using link aggregation groups to forward broadcast packets without duplicates in accordance with an embodiment of the present invention.

Broadcast packets received by a leaf (e.g., top-of-rack) switch may be forwarded based on the source of the broadcast packets. FIG. 20 is a flow chart 280 of illustrative steps that may be performed by a leaf switch in forwarding broadcast packets while helping to ensure that end hosts do not receive duplicate broadcast packets. In scenarios such as when a controller has grouped end hosts into virtual switches and grouped virtual switches into virtual routers, the controller may control the switches (including the leaf switch) to send broadcast packets only to end hosts assigned to the same virtual switch and/or virtual router as the senders of the broadcast packets.

During step 282, the leaf switch may receive a broadcast packet. During subsequent step 282, the leaf switch may determine the source of the broadcast packet. For example, the leaf switch may be configured by the controller to maintain a table that maps ingress ports at which packets are received to groups such as core LAG groups (from core switches), peer LAG groups (from peer switches).

In response to determining that the broadcast packet was received from a server of the same rack as the leaf switch, the leaf switch may forward the broadcast packet during step 286 to the core broadcast LAG maintained at the leaf switch, the LAGs of other end hosts of the same virtual switch as the sender of the broadcast packet, and the peer LAG of the leaf switch (see, e.g., FIG. 19).

In response to determining that the broadcast packet was received from a core switch, the leaf switch may forward the broadcast packet to LAGs of all end hosts of the same virtual switch as the sender of the broadcast packet, and to the peer LAG of the leaf switch.

In response to determining that the broadcast packet was received from a peer LAG group, the leaf switch may assume that the peer leaf switch from which the broadcast packet was received already handled steps 286 and 288, and therefore it is only necessary for the leaf switch to handle forwarding to servers that are not connected to the peer leaf switch. The leaf switch may therefore forward the broadcast packet during step 290 to the end hosts of only the same virtual switch as the sender of the broadcast packet.

Each leaf switch of a rack may be provided with information from the controller that identifies which servers of that rack are connected to only that leaf switch (and not to peer leaf switches of that rack). For example, the controller may use network topology information maintained at the controller to identify which ports of each leaf switch are connected to servers that are not connected to the peer leaf switch (e.g., connections between the peer leaf switch and the server may have failed).

The foregoing is merely illustrative of the principles of this invention and various modifications can be made by those skilled in the art without departing from the scope and spirit of the invention.

What is claimed is:

1. A method of using a controller that controls a plurality of switches in a network having end hosts that are coupled to ports of the switches, the method comprising:
   with the controller, identifying whether a port of a first switch has failed; and
   with the controller, modifying link aggregation group mappings of the plurality of switches in response to identifying that the port of the first switch has failed, wherein modifying the link aggregation group mappings of the plurality of switches comprises:
   modifying a link aggregation table of a second switch that is coupled to the failed port of the first switch via a third switch, wherein the link aggregation table of the second switch includes link aggregation table entries that assign groups of ports of the second switch to respective link aggregation groups, and wherein modifying the link aggregation table of the second switch comprises:
   maintaining a first link aggregation table entry in the link aggregation table of the second switch, wherein the first link aggregation table entry includes a port that is connected to the third switch; and
   adding a second link aggregation table entry to the link aggregation table of the second switch, wherein the second link aggregation table entry excludes the port that is connected to the third switch.

2. The method defined in claim 1 wherein identifying whether the port of the first switch has failed comprises:
   receiving a port failure message from the first switch that identifies the failed port.

3. The method defined in claim 2 further comprising:
   with the controller, communicating with the switches to identify a topology of the network; and
   with the controller, calculating shortest-paths between the switches and the end hosts based on the network topology.

4. The method defined in claim 3 further comprising:
in response to receiving the port failure message, calculating updated shortest-paths between the switches and the end hosts based on the network topology; and
identifying switches having updated shortest-paths.

5. The method defined in claim 4 wherein modifying the link aggregation group mappings of the switches comprises:
with the controller, modifying the link aggregation group mappings of the identified switches.

6. The method defined in claim 5 further comprising:
with the controller, configuring forwarding tables of the identified switches to use the modified link aggregation mappings.

7. The method defined in claim 5 wherein modifying the link aggregation mappings of the identified switches comprises providing flow table entries to the identified switches.

8. The method defined in claim 1 wherein the controller is coupled to the plurality of switches by network control paths and wherein modifying the link aggregation group mappings of the switches comprises providing control messages to the switches over the network control paths.

9. A method of using a controller that controls a plurality of switches in a network having end hosts that are coupled to ports of the switches, the method comprising:
with the controller, identifying whether a port of a first switch has failed; and
with the controller, modifying link aggregation group mappings of the plurality of switches in response to identifying that the port of the first switch has failed, wherein modifying the link aggregation group mappings of the plurality of switches comprises:
modifying a link aggregation table of a second switch indirectly coupled to the first switch, wherein the link aggregation table of the second switch includes link aggregation table entries that assign groups of ports of the second switch to respective link aggregation groups and wherein modifying the link aggregation table of the second switch comprises:
modifying the link aggregation table of the second switch to include:
a first link aggregation table entry for a first link aggregation group that includes a first port coupled to the first switch via a first path and a second port coupled to the first switch via a second path that is different from the first path, wherein the second path is coupled to the first switch through the failed port of the first switch; and
a second link aggregation table entry for a second link aggregation group that includes the first port and does not include the second port.

10. The method defined in claim 9 wherein the second switch includes a forwarding table having forwarding table entries that identify how to forward network packets to destination end hosts, the method further comprising:
with the controller, modifying a first forwarding table entry of the second switch to forward network packets to a first destination end host using the first link aggregation group; and
with the controller, modifying a second forwarding table entry of the second switch to forward network packets to a second destination end host using the second link aggregation group.

11. The method defined in claim 9 wherein identifying whether the port of the first switch has failed comprises:
receiving a port failure message from the first switch that identifies the failed port.

12. A method of operating a controller that controls switches in a network having end hosts that are coupled to ports of the switches, the method comprising:
with the controller, configuring a first switch to form a first link aggregation group from the ports of the first switch;
with the controller, configuring a second switch to form a second link aggregation group from the ports of the second switch;
with the controller, modifying the second link aggregation group at the second switch based on a port failure associated with a failed port at the first switch;
with the controller, forming a third link aggregation group at the second switch based on the port failure at the first switch;
with the controller, configuring the second switch to forward a first set of network packets, using the second link aggregation group at the second switch, to bypass a port of the second switch coupled to the failed port at the first switch; and
with the controller, configuring the second switch to forward a second set of network packets, using the third link aggregation group at the second switch, through the port of the second switch coupled to the failed port at the first switch.

13. The method defined in claim 12 further comprising:
with the controller, configuring the second switch with a forwarding table entry that directs the second switch to forward the first set of network packets for a destination end host through the second link aggregation group.

14. The method defined in claim 13 further comprising:
with the controller, forming virtual switches from groups of end hosts, wherein the forwarding table entry identifies a given virtual switch and only matches network packets received from the group of end hosts of the given virtual switch.

15. The method defined in claim 13 further comprising:
with the controller, receiving a port failure message from the first switch that identifies that a given port of the first switch has failed, wherein modifying the second link aggregation group at the second switch based on the port failure at the first switch comprises:
removing any ports of the second switch that are coupled to the first switch from the second link aggregation group at the second switch.

16. The method defined in claim 15 wherein the forwarding table entry comprises a first forwarding table entry and wherein the destination end host comprises a first destination end host, the method further comprising:
with the controller, configuring the second switch with a second forwarding table entry that directs the second switch to forward the second set of network packets for a second destination end host through the third link aggregation group.

17. A method of operating a controller that controls a rack-based network, wherein the rack-based network includes a plurality of racks each including leaf switches and end hosts that are coupled to ports of the leaf switches, wherein each of the leaf switches of the plurality of racks are coupled to a first core switch and coupled to a second core switch, the method comprising:
with the controller, configuring each of the leaf switches with a plurality of link aggregation groups that each couple that leaf switch to a respective rack of the plurality of racks via a selected one of the first and second core switches;

with the controller, configuring a given leaf switch in the leaf switches with a peer link aggregation group that couples the given leaf switch to a peer leaf switch in the rack of the given leaf switch;

with the controller, identifying a failed port in the rack of the given leaf switch; and in response to identifying the failed port in the rack of the given leaf switch, modifying an additional link aggregation group at the given leaf switch to include at least a port in the peer link aggregation group.

18. The method defined in claim 17 further comprising:
with the controller, configuring each of the leaf switches with a peer link aggregation group that couples that leaf switch to a peer leaf switch of the rack of that leaf switch.

19. The method defined in claim 18 further comprising:
with the controller, configuring each of the leaf switches with a core broadcast link aggregation group that couples that leaf switch to a set of the core switches, wherein each of the set of core switches is connected to each rack of the plurality of racks.

20. The method defined in claim 19 further comprising:
with the controller, configuring the leaf switches to forward broadcast packets using the plurality of link aggregation groups, the peer link aggregation group, and the core broadcast link aggregation group without sending duplicate broadcast packets to any of the end hosts.

* * * * *